(12) United States Patent
Ferlitsch et al.

(10) Patent No.: US 7,770,022 B2
(45) Date of Patent: Aug. 3, 2010

(54) SYSTEMS AND METHODS FOR SECURING AN IMAGING JOB

(75) Inventors: Andrew R. Ferlitsch, Tigard, OR (US); Roy K. Chrisop, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1241 days.

(21) Appl. No.: 10/773,812

(22) Filed: Feb. 6, 2004

(65) Prior Publication Data

US 2005/0177739 A1 Aug. 11, 2005

(51) Int. Cl.
*G06F 11/30* (2006.01)
(52) U.S. Cl. ..................................................... 713/189
(58) Field of Classification Search ................ 713/183, 713/189
See application file for complete search history.

(56) References Cited

U.S. PATENT DOCUMENTS

| | | | | |
|---|---|---|---|---|
| 5,512,977 | A * | 4/1996 | Imai | 399/366 |
| 5,613,012 | A * | 3/1997 | Hoffman et al. | 382/115 |
| 5,970,228 | A * | 10/1999 | Nezu | 726/34 |
| 6,929,413 | B2 | 8/2005 | Schofield | 400/103 |
| 6,968,456 | B1 * | 11/2005 | Tripathi et al. | 713/185 |
| 7,152,045 | B2 * | 12/2006 | Hoffman | 705/43 |
| 7,281,133 | B2 * | 10/2007 | Ginter et al. | 713/176 |
| 7,386,468 | B2 * | 6/2008 | Calderaro et al. | 705/11 |
| 2002/0042884 | A1 * | 4/2002 | Wu et al. | 713/201 |
| 2002/0046350 | A1 * | 4/2002 | Lordemann et al. | 713/201 |
| 2002/0120855 | A1 | 8/2002 | Wiley et al. | |
| 2003/0014368 | A1 * | 1/2003 | Leurig et al. | 705/64 |
| 2003/0081247 | A1 | 5/2003 | Sharma | |
| 2003/0083996 | A1 | 5/2003 | Fischer | |
| 2003/0108373 | A1 * | 6/2003 | Schofield | 400/103 |
| 2003/0117640 | A1 | 6/2003 | Parry et al. | |
| 2003/0140009 | A1 * | 7/2003 | Namba et al. | 705/59 |
| 2005/0275866 | A1 * | 12/2005 | Corlett | 358/1.14 |

FOREIGN PATENT DOCUMENTS

| | | |
|---|---|---|
| EP | 1 197 828 A1 | 4/2002 |
| GB | 2 371 888 | 8/2002 |
| JP | 6-3083825 | 4/1988 |
| JP | 2000-313156 | 11/2000 |
| JP | 2001-312377 | 11/2001 |
| JP | 2002-116901 | 4/2002 |
| JP | 2002-169681 | 6/2002 |
| JP | 2002-190947 | 7/2002 |
| JP | 2002-297510 | 10/2002 |
| JP | 2003-044232 | 2/2003 |
| WO | WO 02/32047 A1 | 4/2002 |
| WO | WO 03/038677 A1 | 5/2003 |

* cited by examiner

*Primary Examiner*—Kambiz Zand
*Assistant Examiner*—Teshome Hailu
(74) *Attorney, Agent, or Firm*—Austin Rapp & Hardman (57) ABSTRACT

A method for securing an imaging job is disclosed. An access control function relating to a document is performed. An auditing function relating to the document is also performed. An imaging job from the document is then generated. Content of the imaging job is encrypted such that a downstream non-content dependent process will still properly process the imaging job. After encryption, a recipient decrypts the encrypted content. Non-destructible information is encoded into the imaging output. Residual data that relates to the imaging job is erased.

25 Claims, 8 Drawing Sheets

SYSTEMS AND METHODS FOR SECURING AN IMAGING JOB

TECHNICAL FIELD

The present invention relates generally to imaging jobs sent to imaging devices through use of a computer. More specifically, the present invention relates to systems and methods for securing an imaging job.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

In many computing environments imaging jobs are not secure. That is, imaging jobs and/or certain information in the imaging job may be viewed, altered and/or otherwise compromised. Benefits may be realized by providing increased security to the hardware and/or software used in processing imaging jobs.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A method for securing an imaging job is disclosed. An access control function relating to a document is performed. An auditing function relating to the document is also performed. An imaging job from the document is then generated. Content of the imaging job is encrypted such that a downstream non-content dependent process will still properly process the imaging job. After encryption, a recipient decrypts the encrypted content. Non-destructible information is encoded into the imaging output. Residual data that relates to the imaging job is erased.

In one embodiment the auditing function may provide reduced content of at least one descriptive aspect of the content and store the reduced content in secured storage. The access control function may determine if a user has authorization to perform a certain operation by using access control information. The access control function may determine authorized content and may cause the authorized content to be processed to create the imaging job.

The imaging job may be transmitted from a client to the recipient. Further, the transmitting may be performed in between the encrypting and the decrypting.

The access control information may include various kind of data including, but not limited to, login identification, a department code, client device identification, recipient device identification, imaging operation, meta-data, a serial number, a network address, a digital signature and/or biometric data.

The non-destructible information encoded into the imaging output may include tracking information. An audit trail may be generated and the audit trail information may be stored. The tracking information may include client tracking information, imaging device tracking information, user tracking information and content tracking information.

A system configured to implement a method for securing an imaging job is also disclosed. The system includes a client device and a recipient device. Client executable instructions executable on the client device are configured to implement a method wherein an access control function relating to a document is performed. An auditing function relating to the document is also performed. An imaging job from the document is then generated. Content of the imaging job is encrypted such that a downstream non-content dependent process will still properly process the imaging job. Now referring to the recipient device, there are recipient executable instructions executable on the recipient device that are configured to implement a method wherein the encrypted content is decrypted. Non-destructible information is encoded into the imaging output. Residual data that relates to the imaging job is erased.

A computer-readable medium for storing program data is also disclosed. The program data comprises executable instructions for implementing a method for securing an imaging job. An access control function relating to a document is performed. An auditing function relating to the document is also performed. An imaging job from the document is then generated. Content of the imaging job is encrypted such that a downstream non-content dependent process will still properly process the imaging job. After encryption, a recipient decrypts the encrypted content. Non-destructible information is encoded into the imaging output. Residual data that relates to the imaging job is erased.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Figure 1:
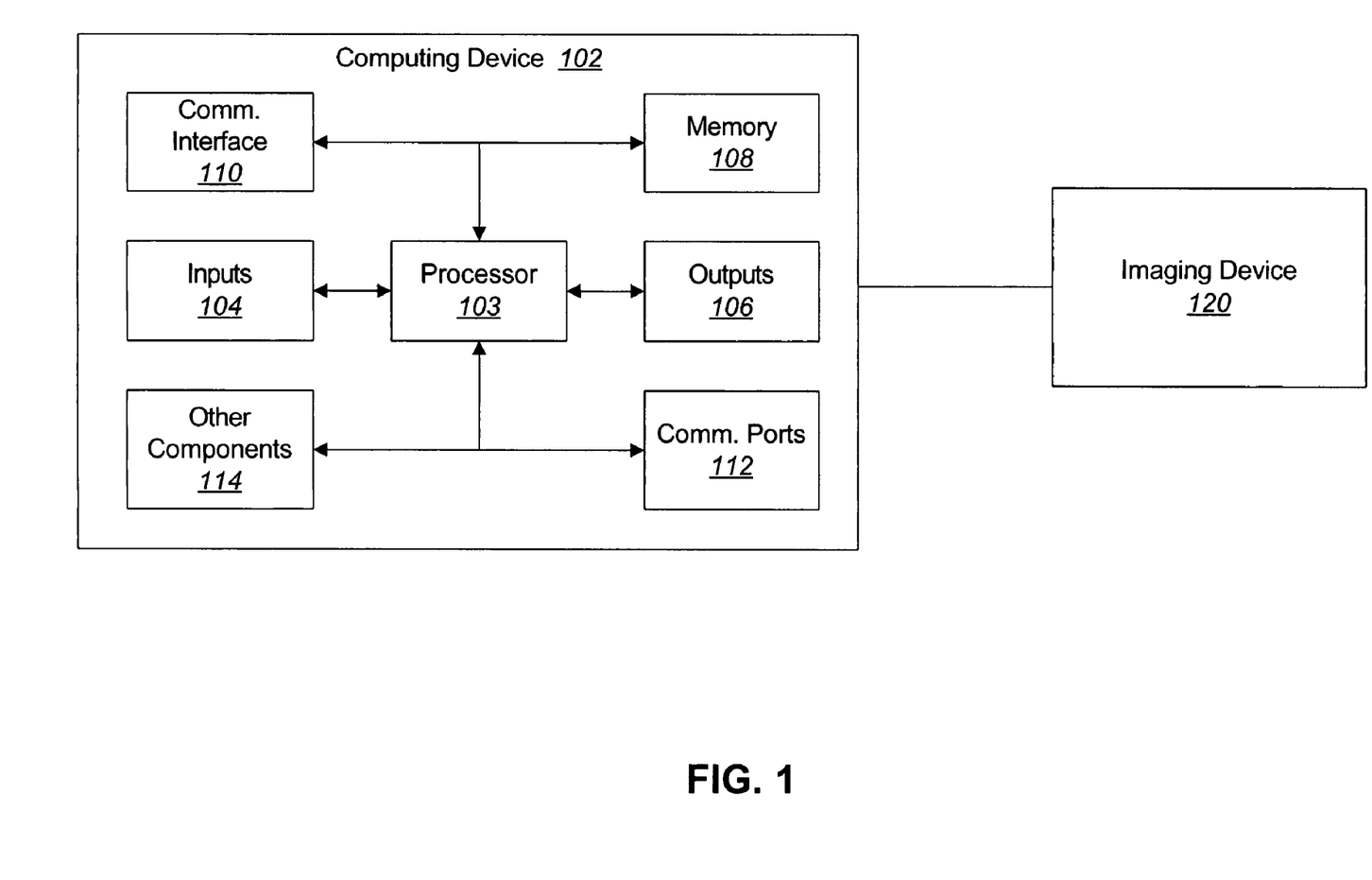
FIG. 1 is a block diagram illustrating the major hardware components typically utilized with embodiments herein.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102, imaging devices 120, servers, etc. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Many kinds of different devices may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. An imaging device 120 is a device that receives or transmits an imaging job, such as a Multi-Function Peripheral ("MFP") or computing device. Imaging devices include, but are not limited to, physical printers, multi-functional peripherals, a printer pool, a printer cluster, a fax machine, a plotter, a scanner, a copier, a logical device, a computer monitor, a file, an electronic whiteboard, a tablet PC, a document server, etc. The imaging device may be a single or a plural grouping (e.g., pool or cluster) of two or more devices.

In light of the definition of an imaging device 120 above, the term imaging job, as used herein, is broadly defined as any instruction or set of instructions that are sent to an imaging device to cause an image to be printed, imaged, scanned, sent, etc., to or from the imaging device 120. Thus, the term imaging job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc. Print jobs and printing devices are used to illustrate exemplary embodiments, but other kinds of imaging jobs and imaging devices may be used in implementations of the embodiments disclosed herein.

Figure 2:
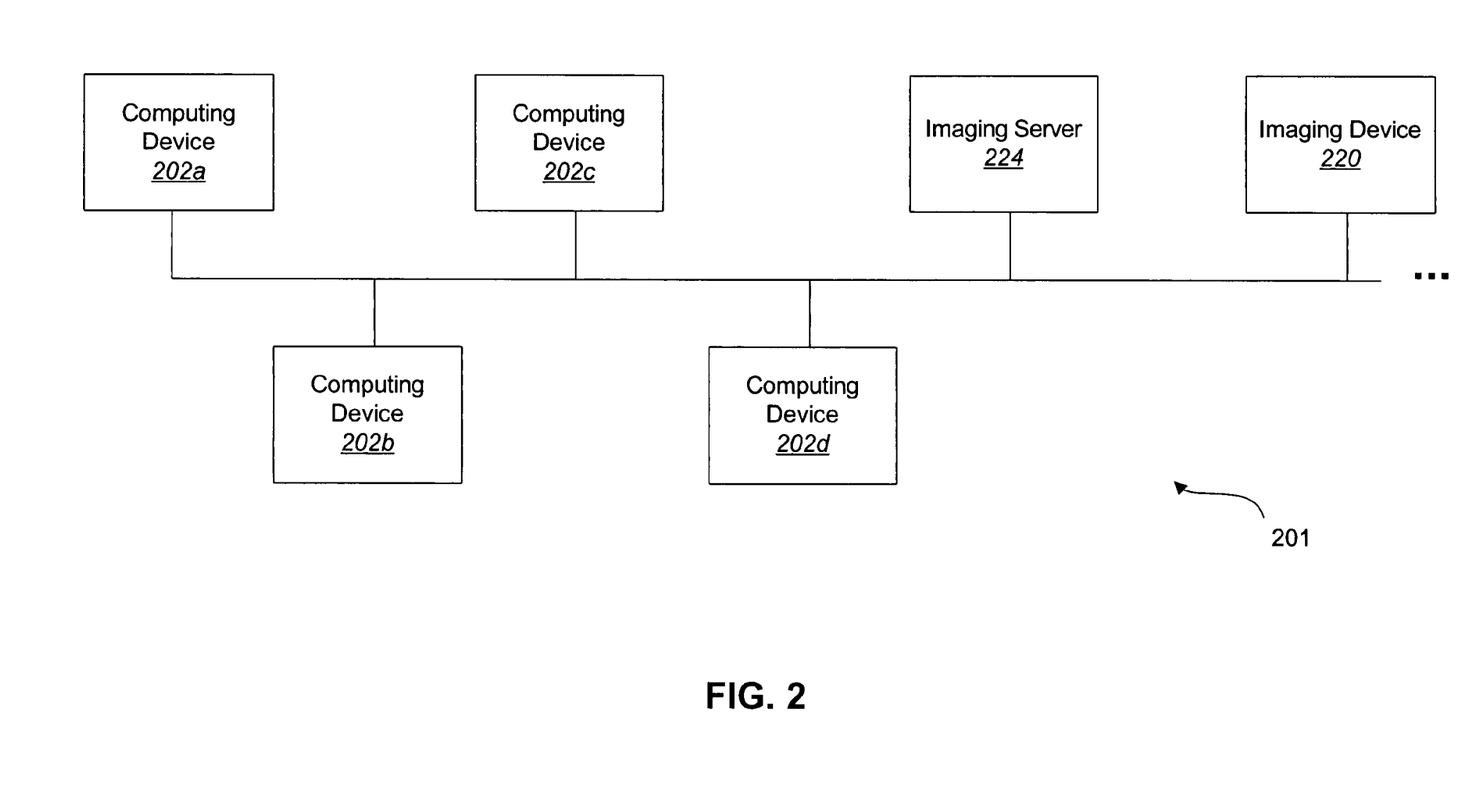
FIG. 2 is a network block diagram illustrating one possible environment in which the present systems and methods may be implemented.

FIG. 2 is a network block diagram illustrating one possible environment in which the present systems and methods may be implemented. The present systems and methods may also be implemented on a standalone computer system. FIG. 2 illustrates a computer network 201 comprising a plurality of computing devices 202, an imaging device 220 and an imaging server 224.

This invention is independent of the job control command and image data language and syntax. For example, the job control language may be PJL and the imaging job data language may be a page description language such as PCL, PDF or Postscript or an image/raster format such as TIFF or JPEG.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is initiated. For example, a print job may be initiated by an application using a printer driver which spools a print job to the print spooler. By way of further example, the print job may be initiated by direct printing using a utility that generates a print job ticket and despools the document data and job ticket directly to the printer.

The systems and methods herein are independent of the method to initiate the imaging job and the method to despool the image job and/or imaging result to/from the imaging client and imaging device. For example, an imaging job may be generated by a printer driver from an application. The application would convert the document into printing instructions, such as GDI (i.e., Graphics Device Interface) in the Microsoft family of operating systems. The printing instructions would then be passed to a printer driver installed on the client and/or server associated with the printing device. The printer driver would then convert the printing instructions into a printer dependent format, such as a raster image or PDL (i.e., Page Description Language). In other cases, such as Direct Printing, the document format can be directly interpreted by the printer and there is no preprocessing of the document format into a printer dependent format.

The embodiments disclosed also operate independently of the protocol used between the client computing and imaging device to obtain the job completion status. For example, the protocol may be a proprietary protocol over TCP/IP. Although Sharp's proprietary NJR (notify job return) protocol over TCP/IP will be used to illustrate some aspects of the various embodiments, other protocols may also be used.

The systems and methods of embodiments of the present invention typically comprise one or more printing devices, which may be connected locally, through a network or through a remote printing environment. These systems and methods may further comprise a computing device capable of generating or transmitting a print job to a printing device or transmitting the location of a print job to a printing device as in "pull printing." These embodiments may also comprise a printer driver, a spooler, a print processor and other print system components that process, transmit or otherwise function to produce a print job. In some embodiments, these components may exist in a Microsoft Windows 98, Me, NT, 2000, XP, 2003 Server or similar operating system. Details of these operating system print system components and processes may be obtained by reference to the Microsoft Windows Driver Development Kits (DDKs) and associated documentation, which are hereby incorporated herein by reference.

Embodiments which utilize a Microsoft Windows® operating system generally comprise a printer driver, spooler, print processor, port monitor and other print system components which process print tasks generated through the operating system and applications running on the operating system. Embodiments used in conjunction with other operating systems will utilize print system components with similar functions, which may be referred to by the terms used in Microsoft Windows® systems.

Exemplary embodiments will be described with terminology related to a Microsoft Windows® environment, however these terms shall relate to equivalent elements in other operating systems. For example, the print processor described in many embodiments will relate to a print processor common in the Windows environment as well as elements with equivalent functions in other operating systems.

The definitions in this and subsequent paragraphs apply throughout this specification and related claims. The term "print job" may refer to any combination of data that can be printed. A print job may comprise text, line art and/or graphics and may comprise part of a page, a single page or many pages. Print jobs may be rendered or un-rendered. Generally, a print job is generated by an application, such as a word processor, spread sheet, etc., however, a print job may also comprise a file or data in memory that may be sent directly to a printer.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

To simplify discussion of a printing system used under a Microsoft Windows® operating system, some groups of system components may be referred to collectively. Some components may also be referred to generically by their group name. For example, a spooler API server may be referred to as a spooler. A group of components comprising a spooler client interface, spooler API server, router, print job creation API and job scheduling API may be referred to as a spooler in a Windows NT/2000 operating system. A group of components comprising a language monitor, port monitor and port driver stack may be referred to as a port manager. A group of components comprising a file format director and EMF print processor DLL may be referred to as a print processor. Equivalent component groups may be referred to by these terms also whether in a Microsoft Windows® operating system or another system.

References to a Microsoft Windows® or Windows operating system may refer to any version or variation of a Microsoft Windows® operating system comprising Windows 95, Windows 98, Windows NT, Windows 2000, Windows ME, Windows XP, Windows 2003 Server and others. While exemplary embodiments may be directed to a Windows operating system and environment, systems and methods directed to other operating systems such as Macintosh, UNIX, DOS, Linux, MVS, AS/400 and others are to be contemplated within the scope of the present invention.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

In a typical printing environment, a user may initiate a print job, which generally comprises a single document generated by an application that is to be printed. In some embodiments of the present invention, a user may also initiate a print task, which may comprise one or more documents consisting of one or more pages each. A print task may also comprise multiple copies of a print job. A print job or task may be pre-processed into printer-ready data, such as output in a page description language (PDL) such as Printer Control Language (PCL), Adobe Postscript®, Adobe Portable Document Format (PDF) and Tagged-Image File Format (TIFF) as non-limiting examples. A print job or task may also be journaled. In a journaled print job or task, rendering instructions are recorded for subsequent playback. Some examples of journaled formats are Microsoft's Enhanced Metafile (EMF) and Sharp's Printer Meta file (PMF).

Generally, when a print job or task is initiated, a user makes an input selection to initiate the process. The computing device may respond with the display of a dialog such as a print dialog box, a command line query, a panel display or some other form of user interface that allows a user to select print task options. One option may be the selection of the printing device such as a printer, plotter, Multi-Function Peripheral (MFP), CD burner or other device. Once the printing device is selected, a driver and, optionally, a print processor and other print system components may be loaded. Once the driver and/or other print system components are loaded, an additional dialog may be presented to prompt a user of options available on the selected device. Options such as print quality, paper size, orientation, tray selection, manual feed, stapling, watermarks, cluster printing, pool printing and other options may be selected.

In some embodiments of the present invention, print system components may present the user with a dialog that provides print job or print task interleaving options. Other embodiments may automatically select interleaving options for print jobs or tasks.

Once printing options have been selected or otherwise established, either manually or automatically, print job or task processing may commence. Print job or task processing may comprise construction of print job or print task specific information by the printer driver. This may comprise device initialization and environment data such as DEVMODE data in a Microsoft Windows® environment. Rendering instructions are then compiled and either recorded for deferred playback (journaled data) or processed into printer-ready data. In some cases, a print task may be partially or wholly rendered into printer-ready data in a previous step and the compilation of rendering instruction may be skipped or partially skipped.

The output from a print driver, in a spooled print environment, may be referred to as a spool file and its contents may be referred to as spool data. A spool file may be recorded on disk, in memory, in cache or other storage media compatible with a computing device. In embodiments herein, a spool file may comprise interleaving data. Interleaving data may comprise printer output mode options such as, but not limited to, output tray options, output page orientation, output page location, media selection or other criteria affecting aspects of printing device output.

When the spool file is complete, control is passed from the driver to another print system component, such as a spooler. In some systems, control is passed from a spooler to a print processor, which may determine whether the data is in a printer-ready format and process the data accordingly. If the data is in a printer-ready format, it may be sent to the port of the selected printing device. If the data is journaled, it may be further processed into a printer-ready format. This process may be referred to as spooling as the data is spooled from the print source (i.e., printer driver) to a spooler, and then immediately or delayed, despooled from the spooler to its destination. Once journaled data is processed into printer-ready data, it may be despooled to the port associated with its destination printing device.

Generally, print jobs, and associated imaging operations, are unsecured. A user typically accesses a document, converts the document into a printer ready format and sends the document to a printing device where it is printed. Throughout this simple form of printing, there are many opportunities for violations of a user's or organizations security interests.

One method of securing a print job is for the sender to encrypt the print job at the sender's location and then decrypt the print job at the recipient's location. In one example, the print job is decrypted at the transport layer, such as using the secured socket layer (SSL) protocol. In another method, the print job is encrypted at the data layer using an encryption schema, such as public/private key encryption method.

Another more advanced and comprehensive system and method for remote printing of secure and/or authenticated documents may be used. This method consists of a sender, recipient and a server, where the sender sends a job for printing, the recipient performs the job of printing, and the server performs the job of authenticating and securing the print job. The server may optionally be a hardware device, which is an integral component of the printer. The server receives a document for printing from the sender and forwards it to recipient for printing. The server, sender and recipient perform the following actions:

1. The document is authenticated prior to being forwarded from the server to the recipient. The printer may also be authenticated, such as using the printer's serial number and IP address. Other access controls may be performed such as access to the device and document content.

2. The server performs printing controls, as requested by the sender, such as ensuring the content of the document is unchanged, anti-forgery and anti-copying controls, permission to print, and/or controls on the number of copies to print.

3. The server maintains an audit trail in an evidence database. The audit trail may consist of the time of the transaction, storing a copy of the encrypted document, recipient information, and record of the process results.

4. The document is encrypted and a digital signature is added prior to being sent to the recipient.

5. Anti-copying and other authentication means are added to the document for printing, such as an optical watermark, special inks or special paper.

6. The document is decrypted at the recipient.

7. The document is printed with the proper seal on it.

8. After the print job is completed, the printer deletes the document.

9. Release or access to the print job at the printer may be further control by requiring the user to enter a password at the device (e.g., PIN printing).

The system and methods described below disclose a more effective method of securing a print job between a sender and recipient, for both user and organizational security, from inception to finality of the output. In the embodiments herein, inception of a print job occurs at a sender and completes to output finality at a recipient. The processing of the print job between the sender and recipient achieves an effective method of user security (i.e., security issues of concern to the user) and organizational security (i.e., security issues of concern to the organization) using a Restrict/Audit/Encrypt/Track/Destroy imaging model, which is summarized as:

Restrict: Performing access/authentication controls to the document, content, device and imaging operation.

Audit: Recording reduced content of the imaging operation at a secured location.

Encrypt: Encrypting the document content portion of the job.

Track: Encoding into the imaging job output information to trace back who/where the job was imaged.

Destroy: Erase all disk/memory ghost images from the job from inception to finality.

Figure 3:
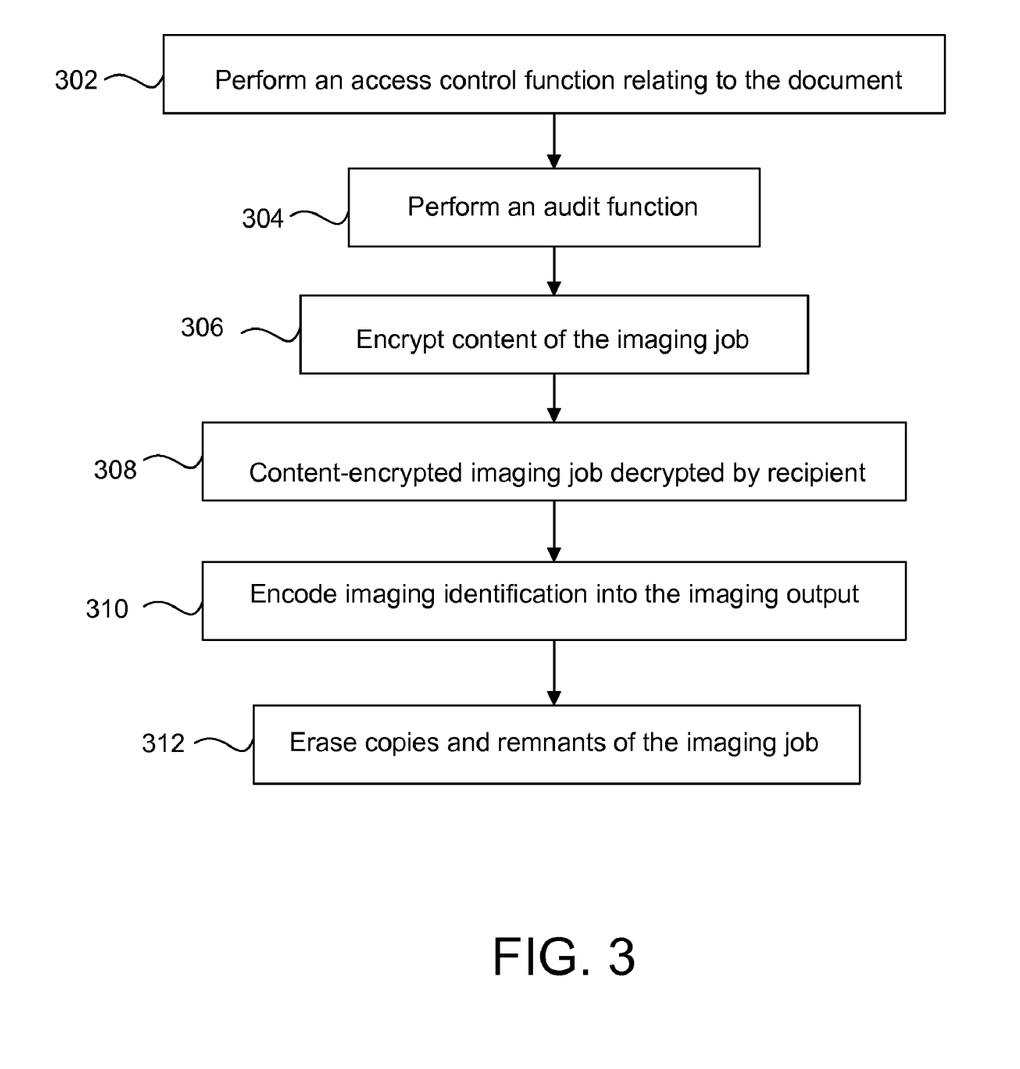
FIG. 3 is a flow diagram illustrating one method for securing an imaging job.

FIG. 3 is a flow diagram illustrating one method for securing an imaging job. Although in FIG. 3 reference will be made to the sender, the recipient may also perform some or all of these operations. In this method, the sender performs the following operations in the following order. Additional details about the method will be further described hereafter. First, the sender performs 302 one or more access control functions relating to the document. The access control function may relate to the content, the imaging device and/or an imaging operation. Then the sender performs 304 an auditing function wherein reduced content of at least one descriptive aspect of the content is stored at a secured location. Next the sender encrypts 306 the content of the imaging job (e.g., ink on paper), such that any downstream non-content dependent process still functions. In one embodiment the sender encrypts only the content of the print job.

The content-encrypted imaging job is only decrypted 308 by the recipient. The recipient encodes 310 into the imaging output non-destructible information (e.g., steganography) to trace back who/where the job was imaged. Finally, the sender and/or recipient erase 312 all copies and intermediate data of the imaging job which may contain content information. Additional details about the above method will be further described hereafter in relation to FIGS. 4-8.

Figure 4:
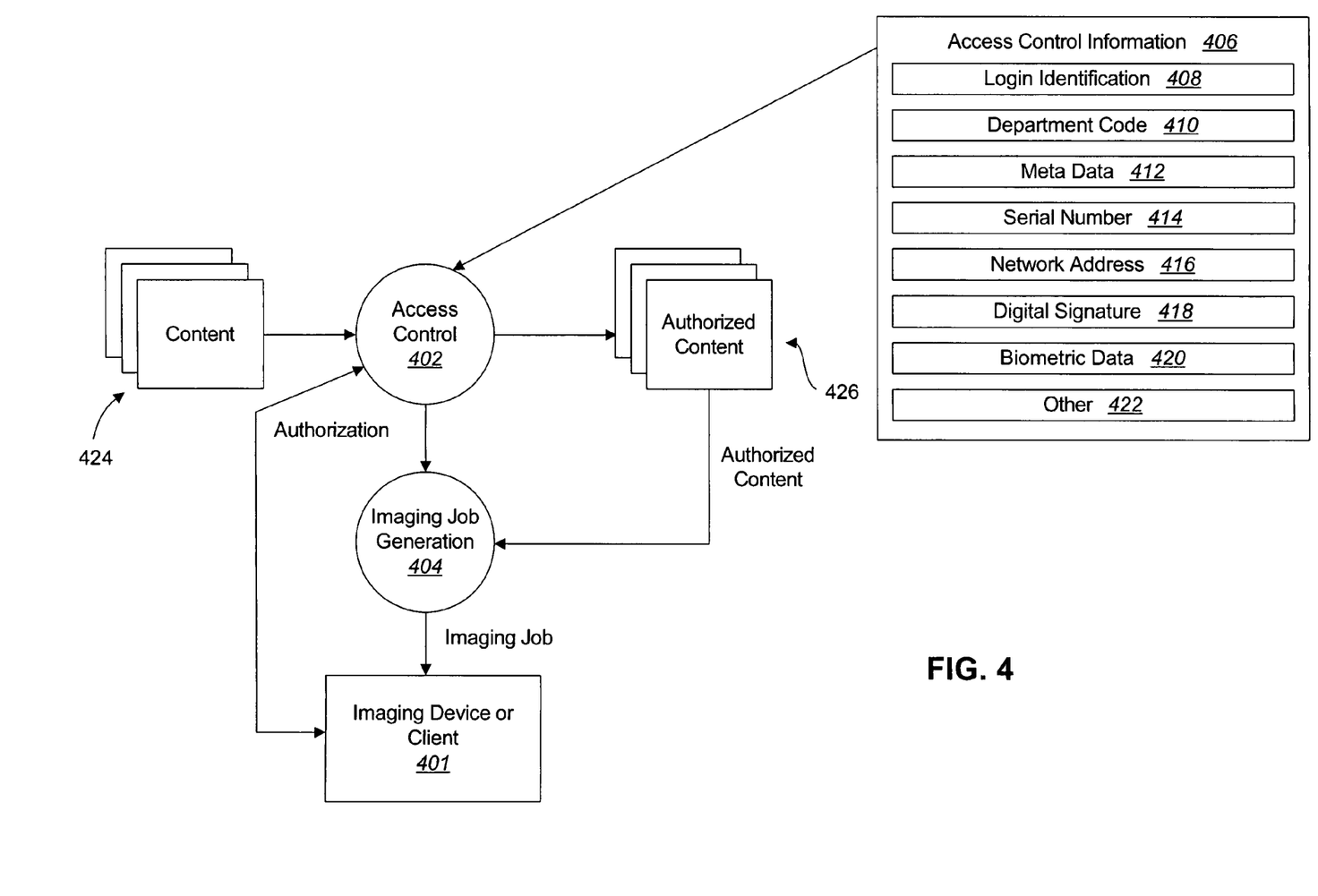
FIG. 4 is a logical block diagram illustrating an access control function.

FIG. 4 is a logical block diagram illustrating an access control function. In one embodiment the imaging client 401 performs various access control 402 functions at the inception of the imaging job, but before the generation 404 of the imaging job. Some access control functions 402 may be performed by the imaging client 401 or the imaging device 401 depending on how one of ordinary skill in the art implemented the present systems and methods. The access control 402 may determine if the user has authorization to perform certain operations. The access control 402 process may use access control information 406 to determine if the user has authorization to perform certain operations. These operations may include, but are not limited to: accessing the document, accessing some or all the content in the document, accessing the imaging device 401, and/or performing the imaging operation on the imaging device 401 for the document content.

Access control information 406 is any information that may be used to determine if the user has authorization to perform one or more operations. For example, the imaging client may use the user's login identification 408 or department code 410 to determine if the user has access rights to the desired document. In another example, the document may contain meta-data 412 describing access controls to sections of content and/or operations.

In another example, a document may contain more than one level of secured content (e.g., top-secret vs. confidential). In the case where the user may only have access rights to only one or a few of the total secured content levels, the access control 402 process would only authorize access to the subset of content for which the user has access rights to. Other access controls may restrict/permit the user to certain imaging operations (e.g., view, update, print, fax) on some and/or all of the content.

In another example, the imaging client may use the serial number 414 and network address 416 of the imaging device to determine if the user has access rights to the device for the imaging operation. In another method, the imaging device may determine the access rights by using the user's ID 408, network address 416 of the imaging client and other authenticating information, such as a digital signature 418 or biometric data 420 (e.g., fingerprint). Access control information 406 may also include a client device identification, a recipient device identification and/or an imaging operation. Other 422 data may also be used as access control information 406. If the imaging job passes through an intermediate device between the client and recipient, such as a print server, the access control information may include the intermediate device identification.

Once the access to the document 424, device and operation is authorized, the authorized portion 426 of the document is passed to the imaging job creation process 404. Thus, the authorized content 426 is typically a subset of the content 424.

Figure 5:
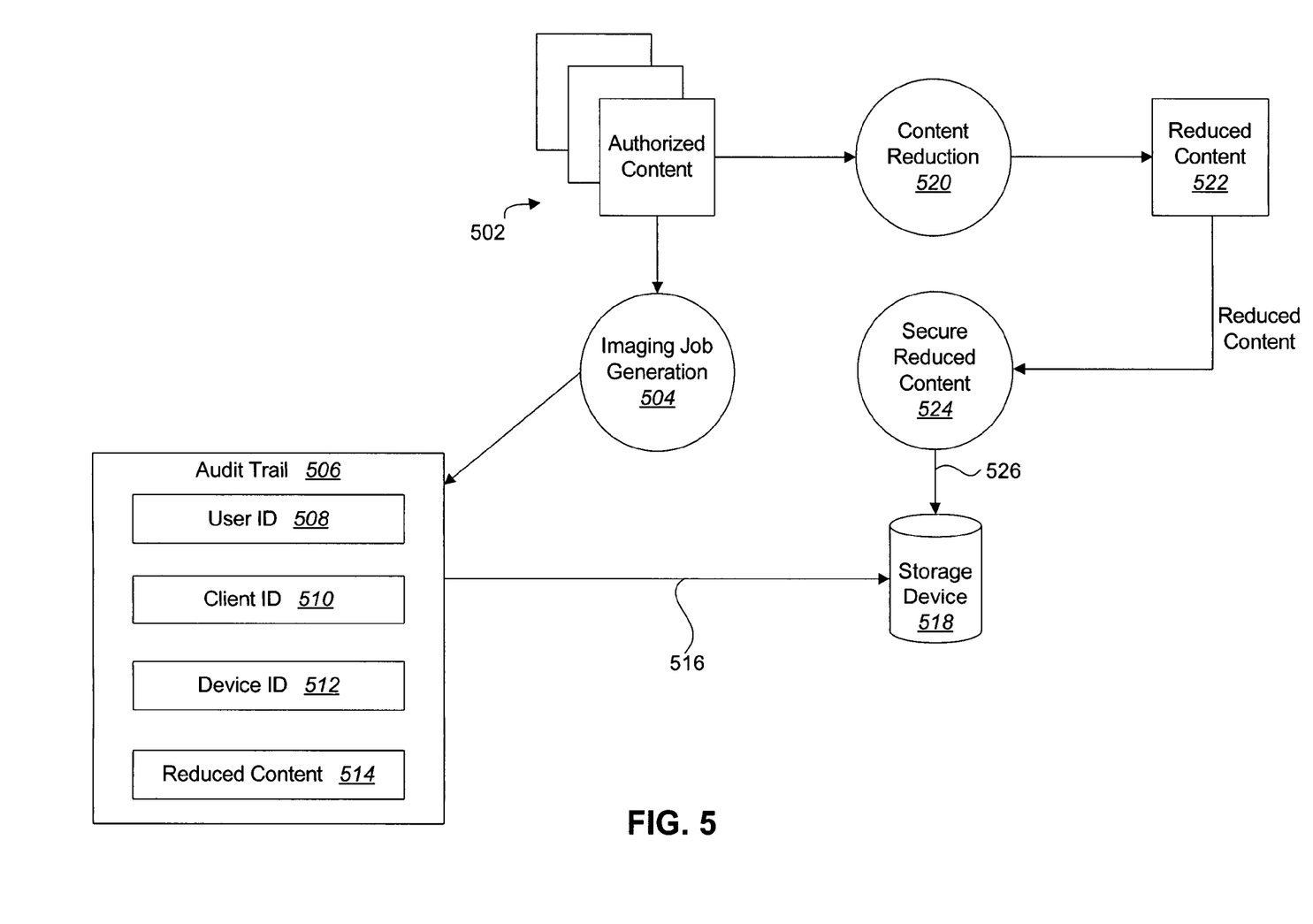
FIG. 5 is a logical block diagram illustrating audit tracking during imaging job generation.

Referring now to FIG. 5, a system for audit tracking during imaging job generation is shown. In one embodiment, the authorized content 502 is passed to the imaging job creation process 504. As part of the process 504, an audit trail 506 is produced of the imaging job. The audit trail 506 may contain audit trail information. The audit trial information may include, but is not limited to: (1) information 508 identifying the user and imaging client 510 that is initiating the imaging job, (2) information identifying the imaging device 512 that will perform the imaging job, and/or (3) a reduced content 514 (e.g., thumbnail) of some characteristic or aspect of the authorized document 502. The audit trail information 506 is then passed by secured means 516, such as a secured transport layer, to a secured storage 518.

A content reduction process 520 extracts some subset of the content information that is less than the entire authorized content 502 by some means of reduction. Some examples of content reduction will be illustrated. The reduced content information 522 may be stored on a some or all per page basis. One example of reduced content information 522 may be text output and reduced (thumbnail) resolution images of bitmaps (e.g., such as by reducing the dots per inch or using a lossy image compression). In one embodiment the reduced content information 522 may not include font information, vector and page layout. Other configurations of the reduced content information 522 are possible and may be selected by those implementing the present systems and methods. For bitmaps, content reduction 520 may be achieved by using a selective sub-image extraction by segmentation. For scan jobs, the reduced content information 522 may be the text output produced by Optical Character Recognition ("OCR"), if available, and reduced (thumbnail) resolution images of the page. The image information that provides no significant content information may be filtered, such as color information (i.e., image detail is in the luminous channel), which reduces the content. Finally, another example of content reduction 520 is by using a grammatical summary of the textual information.

The reduced content information 522 is secured thereby producing secured reduced content 524. The secured reduced content 524 is sent via a secured transmission path 526 to the secured storage 518.

If the storage area 518 overflows, the reduced content information 522 previously stored may be overridden, such as by oldest date, further reduced, and/or moved to a secondary storage device.

Figure 6:
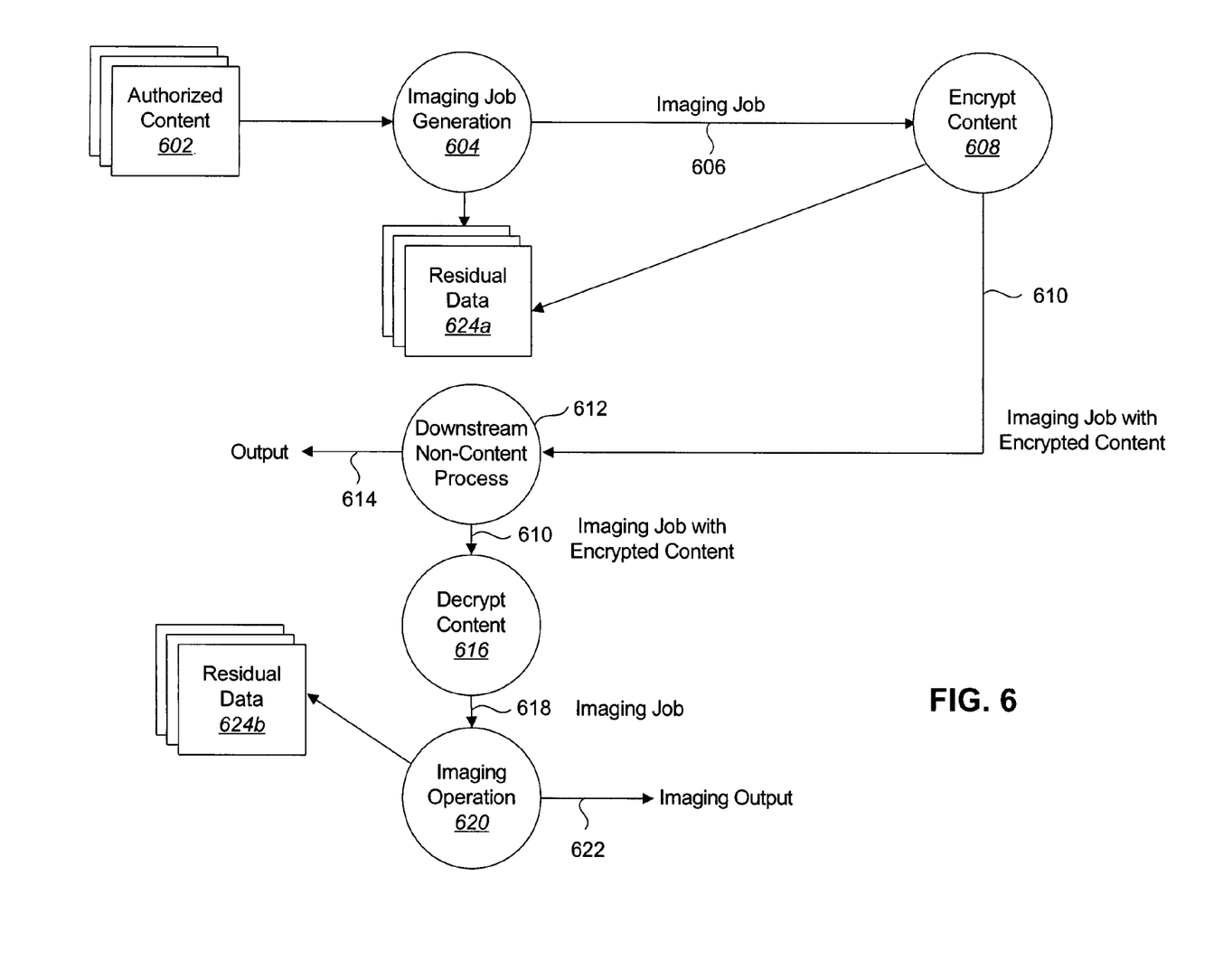
FIG. 6 is a logical block diagram illustrating encryption and decryption during an imaging operation.

Referring now to FIG. 6, a diagram illustrating imaging job encryption/decryption is shown. Authorized content 602 is used by the imaging job generation process 604 to produce an imaging job 606. In this embodiment, the imaging job 606 is encrypted at the data layer by the imaging job creation process 604 in the imaging client. The data in the imaging job 606 is divided into two categories. The first category is content. Content includes instructions that produce visible information on the output media. For example, in a print job any instruction that produces ink on paper would be considered content. The second category is non-content. Non-content includes any instruction that does not produce visible information on the output media. For example, in a print job any instruction that does not produce ink on paper, such as job or page control instructions, would be considered non-content.

The encryption process 608 then encrypts only the content data in the imaging job 606 and leaves the non-content data in the clear (i.e., not encrypted). Thus, the encryption process 608 provides the imaging job 610 with encrypted content and clear non-content. In this manner, any process 612 downstream from the imaging job generation process 604 and prior to decryption that is not dependent on the document content would still function. Such downstream non-content processes 612 would be able to continue to operation and provide expected output 614. For example, the encrypted imaging job may be passed through a job accounting process, where the process analyzes the printing instructions to determine the amount of paper that will be consumed and charge the correct department accordingly. Such a process would be dependent on parsing job and page control instructions, but would not be dependent on parsing the document content.

Once the print job content is encrypted, the print job is spooled/de-spooled to the imaging device. The imaging job may be further secured by encrypting the print job at the transport layer by using a secured transmission protocol, such as SSL (secured sockets layer). Regardless of the path followed by the print job from the imaging client to the imaging device 120, the content of the imaging job is not decrypted prior to receipt by the imaging device 120.

The imaging device 120 (shown generally in FIG. 1) defers decrypting 616 the content of the imaging job until the content is being processed for final output. For example, the imaging job is left encrypted while the imaging job is held in an internal print queue. When the imaging job 610 is ready for final output processing, the content is decrypted by a decrypt content process 616 and the non-encrypted content imaging job 618 is processed by any remaining imaging operations 620 for final imaging output 622.

Residual data 624 is sometimes produced during imaging. FIG. 6 illustrates some examples of residual data 624. Residual data 624 is any data produced by computer processes during the processing of an imaging job which includes from imaging job creation to final output. For example, residual data 624 includes intermediate data containing content of the imaging job from memory, such as disk and RAM. When a print job is created, the job generation process 604 may produce intermediate data, such as in a file or RAM, containing some or all of the content of the job, which is later processed into a final imaging job.

Figure 7:
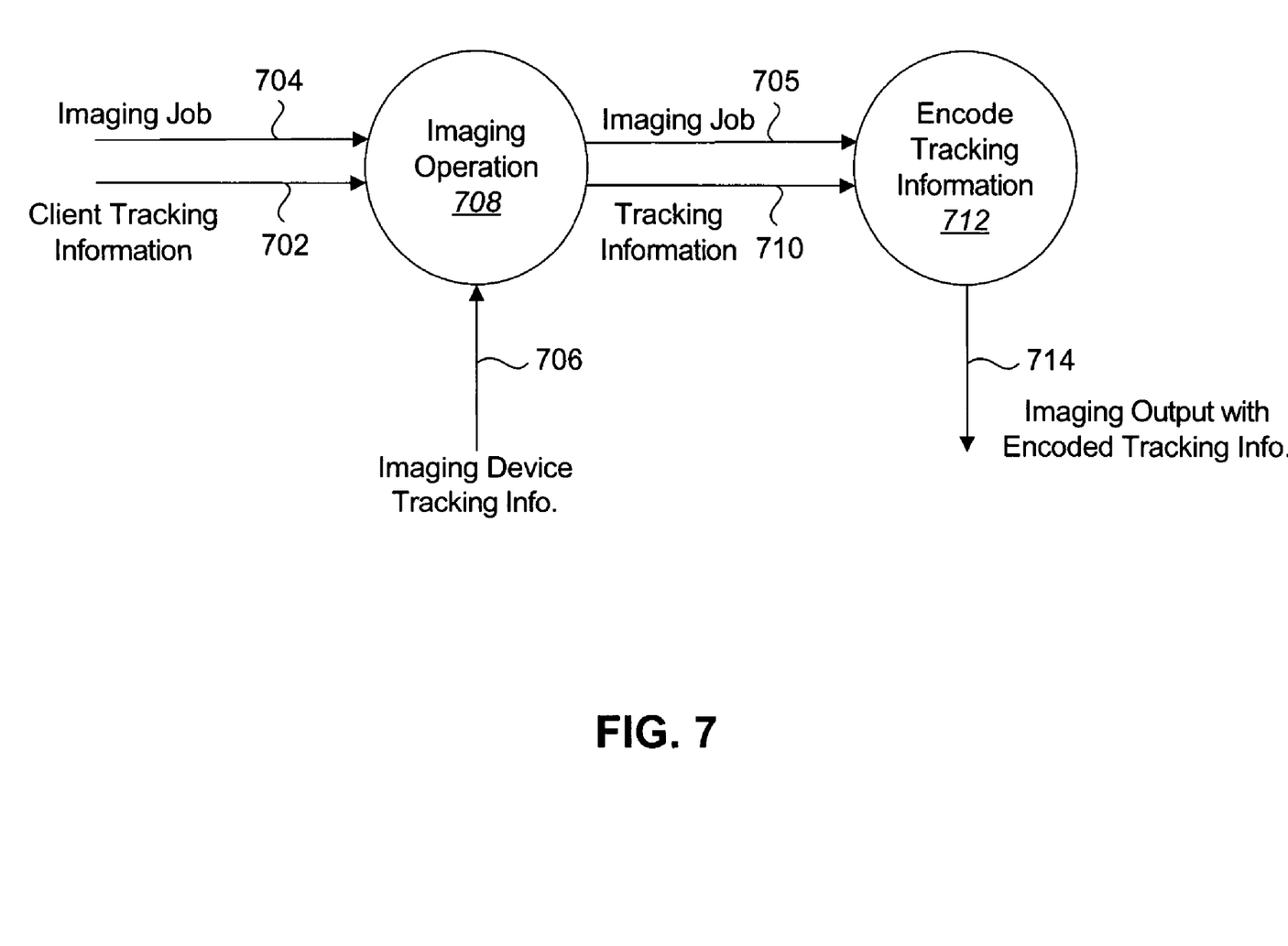
FIG. 7 is a logical block diagram illustrating the encoding of tracking information into imaging output.

FIG. 7 is a logical block diagram illustrating the encoding of tracking information into imaging output. In this embodiment, the client sends client tracking information 702 and the imaging job 704. Typically the client tracking information 702 is sent with the encrypted content imaging job 704. The client tracking information 702 is any information from the client that may be used to track the imaging job 704. For example, the client tracking information 702 may identify the document origin, user and client that initiated the imaging job along with the encrypted content imaging job.

The imaging device may include imaging device tracking information 706. The imaging device tracking information 706 is any information from the imaging device 120 (shown generally in FIG. 1) that may be used to track the imaging job 704. For example, the imaging device tracking information 706 may include a printer serial number, a network address and/or a timestamp. The imaging device 120 combines the client side information 702 with information 706 on the imaging device 120 by an imaging operation 708 to form tracking information 710 on the imaging job 704.

Other kinds of tracking information may also be used. Other examples include, but are not limited to, user tracking information and content tracking information.

The tracking information 710 is then encoded 712 as part of the imaging job output. An encoding process 712 takes the tracking information 710 and the imaging output 705 and encodes the tracking information 710 into the imaging output 705 to produce imaging output with encoded tracking information 714. The tracking information 710 can then be later decoded, such as by a special optical scanning device, to determine who, when and/or where the document was imaged. In one embodiment the tracking information 710 is output in the imaging job in such a manner as to prevent the encoded information from being subsequently destroyed or forged (e.g., steganography). For example, the information may be encoded into the document using magnetic ink character recognition (MICR).

Figure 8:
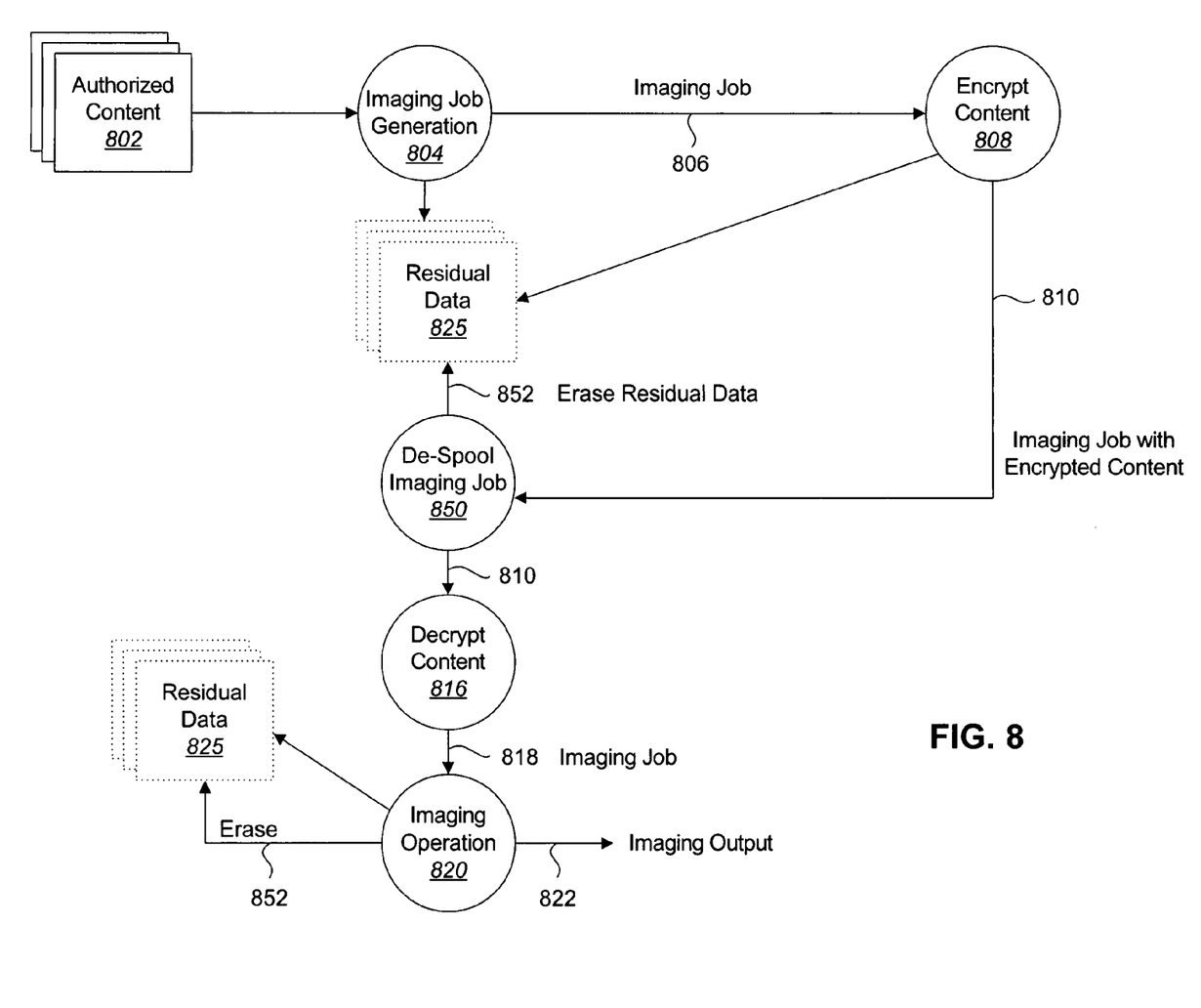
FIG. 8 is a logical block diagram illustrating the erasing of residual data.

FIG. 8 is a block diagram illustrating that the imaging client and imaging device destroy all residual copies and intermediate data containing content of the imaging job from memory, such as disk, flash and RAM. FIG. 8 is similar to FIG. 6 and the data and processes description above in relation to FIG. 6 may also apply to FIG. 8.

When a print job is created, the job generation process 804 may produce intermediate data, such as in a file or RAM, containing some or all of the content of the job, which is later processed into a final imaging job. The intermediate data 825 is a type of residual data 624. The imaging job may then be spooled to a spooler, which may then create another copy of the imaging job on disk for later de-spooling to the device. The de-spooling process 850 in the imaging job may additionally produce residual images of the print job, as the data is read from disk into memory and then passed to another process for handling port communication, which itself may produce residual data or copies of the content.

Even when a file is deleted in a typical operating system (e.g., MS-Windows, UNIX) the physical data is not necessarily deleted from the disk and may be subsequently recovered. The data that is still there despite the fact that the file was deleted is a type of residual data 624.

In this system, the imaging client's imaging job generation 804, spooling and de-spooling process 850 and imaging operation process 820 all cooperate to identify all copies and residual images of the imaging job in memory. Upon each components processing, each component then physically erases 852 from memory the associated copies and residual images 825. Such methods may require repeated overwrites or certain data patterns to the physical location where the data resided. Such methods are disclosed in U.S. patent application entitled "Random Bit Mask Generation for Obscuring Data on Nonvolatile Memory Device," Publication No.

20010025343, incorporated herein by reference. Methods are also disclosed in "Secured Deletion of Data from Magnetic and Solid-State Memory," by Dr. Peter Gutmann, incorporated herein by reference.

Other embodiments include other imaging operations such as fax, scan, copy and document management, such as document archive/retrieval, manipulation and transfer. In further embodiments, a conventional printer and a dedicated computing device can be substituted for the secured printer; whereby, the dedicated computing device performs the secured functions (e.g., decryption, auditing and erasing storage) and sends the decrypted print job to the conventional printer.

The present systems and methods may be implemented in many different embodiments. Other embodiments include but are not limited to the spooling and despooling subsystems of the Apple Macintosh operating system, the Linux operating system, System V Unix operating systems, BSD Unix operating systems, OSF Unix operating systems, Sun Solaris operating systems, HP/UX operating systems and IBM Mainframe MVS, AS/400 and OS/390 operating systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for securing an imaging job, the method comprising:
performing an access control function relating to a document;
performing an auditing function relating to the document, including extracting reduced content information from the document and storing the reduced content information in secured storage as at least part of an audit trail generated by the auditing function;
generating an imaging job from the document;
encrypting content of the imaging job and not encrypting non-content such that a downstream non-content dependent process will still properly process the imaging job;
decrypting the encrypted content by a recipient;
encoding into imaging output non-destructible information; and
erasing all content of the imaging job both on a client device and an imaging device, the content of the imaging job comprising instructions configured to produce visible information on the imaging output, wherein the imaging job was generated from the document by an application, and wherein the application is not part of the imaging job.

2. The method of claim 1, further comprising transmitting the imaging job from a client to the recipient, and wherein the transmitting is performed in between the encrypting and the decrypting.

3. The method of claim 1, wherein the actions are performed in the order as listed.

4. The method of claim 1, wherein the access control function determines if a user has authorization to perform a certain operation by using access control information.

5. The method of claim 4, wherein the access control information comprises data that is selected from the group consisting of a login identification, a department code, client device identification, recipient device identification, imaging operation, meta-data, a serial number, a network address, a digital signature and biometric data.

6. The method of claim 1, wherein the access control function determines authorized content and causes the authorized content to be processed to create the imaging job.

7. The method of claim 1, wherein the non-destructible information encoded into the imaging output comprises tracking information.

8. The method of claim 7, wherein the tracking information comprises client tracking information and imaging device tracking information.

9. A system for securing an imaging job, the system comprising:
- a client device having a processor and memory in communication with the processor;
- client executable instructions stored in the memory, wherein the client executable instructions are executable to:
  - perform an access control function relating to a document;
  - perform an auditing function relating to the document, including extracting reduced content information from the document and storing the reduced content information in secured storage as at least part of an audit trail generated by the auditing function;
  - generate an imaging job from the document;
  - encrypt content of the imaging job and not encrypting non-content such that a downstream non-content dependent process will still properly process the imaging job; and
  - erase all content of the imaging job on the client device, the content of the imaging job comprising instructions configured to produce visible information on imaging output, wherein the imaging job was generated from the document by an application, and wherein the application is not part of the imaging job;
- a recipient imaging device; and
- recipient executable instructions executable on the recipient device, wherein the recipient executable instructions are executable to:
  - decrypt the encrypted content;
  - encode into the imaging output non-destructible information; and
  - erase all content of the imaging job on the recipient imaging device.

10. The system of claim 9, wherein the client executable instructions are further executable to transmit the imaging job from the client device to the recipient device, and wherein the transmitting is performed after the client device encrypts the content.

11. The system of claim 9, wherein the access control function determines if a user has authorization to perform a certain operation by using access control information.

12. The system of claim 11, wherein the access control information comprises data that is selected from the group consisting of a login identification, a department code, client device identification, recipient device identification, imaging operation, meta-data, a serial number, a network address, a digital signature and biometric data.

13. The system of claim 9, wherein the access control function determines authorized content and causes the authorized content to be processed to create the imaging job.

14. The system of claim 9, wherein the non-destructible information encoded into the imaging output comprises tracking information.

15. The system of claim 14, wherein the tracking information comprises client tracking information, imaging device tracking information, user tracking information and content tracking information.

16. A computer-readable medium storing program data, wherein the program data comprises executable instructions for securing an imaging job, the instructions being executable to:
- perform an access control function relating to a document;
- perform an auditing function relating to the document, including extracting reduced content information from the document and storing the reduced content information in secured storage as at least part of an audit trail generated by the auditing function;
- generate an imaging job from the document;
- encrypt content of the imaging job and not encrypting non-content such that a downstream non-content dependent process will still properly process the imaging job;
- decrypt the encrypted content by a recipient;
- encode into imaging output non-destructible information; and
- erase all content of the imaging job both on a client device and an imaging device, the content of the imaging job comprising instructions configured to produce visible information on the imaging output, wherein the imaging job was generated from the document by an application, and wherein the application is not part of the imaging job.

17. The computer-readable medium of claim 16, wherein the instructions are further executable to transmit the imaging job from a client to the recipient, and wherein the transmitting is performed in between the encrypting and the decrypting.

18. The computer-readable medium of claim 17, wherein the actions are performed in the order as listed.

19. The computer-readable medium of claim 18 wherein the access control function determines if a user has authorization to perform a certain operation by using access control information.

20. The computer-readable medium of claim 19, wherein the access control information comprises data that is selected from the group consisting of a login identification, a department code, client device identification, recipient device identification, imaging operation, meta-data, a serial number, a network address, a digital signature and biometric data.

21. The computer-readable medium of claim 19, wherein the access control function further determines authorized content and causes the authorized content to be processed to create the imaging job.

22. The computer-readable medium of claim 21, wherein the non-destructible information encoded into the imaging output comprises tracking information.

23. The method of claim 1, wherein the content of the imaging job is immediately erased from both the client device and the imaging device.

24. The system of claim 9, wherein the content of the imaging job is immediately erased from both the client device and the imaging device.

25. The computer-readable medium of claim 16, wherein the content of the imaging job is immediately erased from both the client device and the imaging device.

* * * * *

UNITED STATES PATENT AND TRADEMARK OFFICE
CERTIFICATE OF CORRECTION

| | | |
|---|---|---|
| PATENT NO. | : 7,770,022 B2 | Page 1 of 1 |
| APPLICATION NO. | : 10/773812 | |
| DATED | : August 3, 2010 | |
| INVENTOR(S) | : Andrew R. Ferlitsch et al. | |

It is certified that error appears in the above-identified patent and that said Letters Patent is hereby corrected as shown below:

In the Title Page Item (56) "References Cited" Foreign Pat. Docs please add --JP 2001-277605--.

Signed and Sealed this
Eighteenth Day of January, 2011

David J. Kappos
*Director of the United States Patent and Trademark Office*